United States Patent [19]

Chapman

[11] Patent Number: 5,432,506
[45] Date of Patent: Jul. 11, 1995

[54] COUNTERFEIT DOCUMENT DETECTION SYSTEM

[76] Inventor: Thomas R. Chapman, 5600 Woodland La. SW., Fort Lauderdale, Fla. 33312

[21] Appl. No.: 840,540

[22] Filed: Feb. 25, 1992

[51] Int. Cl.[6] ............................................. G06F 15/30
[52] U.S. Cl. .............................. 340/825.34; 364/408; 235/379; 380/23
[58] Field of Search ................ 340/825.34, 825.33; 235/379, 380, 381, 382; 380/23; 382/7; 364/408

[56] References Cited

U.S. PATENT DOCUMENTS

| | | | |
|---|---|---|---|
| 3,985,998 | 10/1976 | Crafton | 340/825.33 |
| 4,258,252 | 3/1981 | Simjian | 235/432 |
| 4,469,937 | 9/1984 | Stockburger et al. | 340/825.34 |
| 4,472,626 | 9/1984 | Frid | 235/379 |
| 4,568,936 | 2/1986 | Goldman | 340/825.34 |
| 4,630,201 | 12/1986 | White | 364/408 |
| 4,635,054 | 1/1987 | Goldman | 340/825.34 |
| 4,686,527 | 8/1987 | Goldman | 340/825.34 |
| 4,705,938 | 11/1987 | Stockburger et al. | 340/825.34 |
| 4,798,403 | 1/1989 | Nelson | 283/70 |
| 4,807,287 | 2/1989 | Tucker et al. | 340/825.34 |
| 5,341,428 | 8/1994 | Schatz | 340/825.34 |

Primary Examiner—Donald J. Yusko
Assistant Examiner—Edward Merz
Attorney, Agent, or Firm—Alvin S. Blum

[57] ABSTRACT

A system for verifying the authenticity of a document that bears a number of fields of strings of variable characters such as a check bearing date of issue field, payee field and numeric and alpha amount fields, includes a computer at the document issuing and printing station that controls the computer. A secret program selects certain characters from the strings, transforms those characters into other characters by various methods to generate a unique string of characters to print on the document as a unique code. Any remote authenticating station can authenticate the document with a computer that contains the same secret program used at the time the document was issued. The strings of variable characters born by the document are read into the computer at the authenticating station. The secret program causes the computer to generate an authenticating code from the data read into the computer from the document. The computer compares the authenticating code to the unique code born by the document. If they do not match, the document is rejected as bogus. The system may be applied to checks, money orders, stock certificates, passports and other documents subject to counterfeiting and forgery.

14 Claims, 1 Drawing Sheet

COUNTERFEIT DOCUMENT DETECTION SYSTEM

BACKGROUND OF THE INVENTION

This invention relates to security systems for checks and the like and more particularly to a system that imprints upon the instrument a unique, computer-generated code based on data imprinted on the instrument. The same code can only be generated by a redeeming or clearing agency that has access to the same secret computer program. If the code imprinted on the check does not match the code generated by the computer at the redeeming agency, a fraudulent document has been detected.

In the current art, the issuing of large numbers of checks in a business operation are performed on a laser printer under computer control. A paper feed stock to the printer is provided with the account number imprinted with magnetic ink so that the character may be read by a magnetic reader or an optical character reader.

The check part of the blank sheet has a special background or border engraving that is difficult to copy and the check number and elements that appear on every check such as firm name, pay to the order, etc. are also pre-imprinted so that only the blanks, the date, payee, amount and signature are filled in by the printer to complete the check.

New developments in optical scanners and lasers now make it fairly simple and inexpensive to duplicate the special blanks, and laser printers with magnetic toner are available to reproduce the original stock account numbers. When a nicely counterfeited check is cashed by a bank clearing operation, the bank has been duly diligent, so the account holder is the loser. And the loss will come to light only after the accounts are reconciled.

As these scanners and printers become more sophisticated and available, the threat to the financial community becomes more and more serious, and may jeopardize the stability of many institutions while enriching the criminals who are in little danger themselves.

There is no way at present that the bank can recognize that a check is counterfeit if the appearance of the check, the account number, and the signature have been exactly copied by a high resolution scanner and printer. The bank has no way of authenticating the date, payee and amount.

SUMMARY OF THE INVENTION

It is accordingly an object of the invention to provide a means for a check clearing agency or other financial instrument authenticating or redeeming agency to authenticate a document by entry of certain elements written or printed on the instrument into a computer, with the computer generating a code that it compares with a unique code on the check, wherein a mismatch indicates fraud.

It is a further object of the invention that the unique code marked on the instrument be generated by a computer using a special algorithm or program that may be changed at various times by the issuing agency, and that the clearing agency be provided with the same algorithms or programs for authenticating by generating the same unique number for test comparison.

The authenticating and counterfeit instrument detection system of the invention comprises:

A. at the issuing agency:
   1) means for inputting into a computer, strings of characters representing constant and variable data to be marked upon the checks;
   2) program and computer means for selecting certain of those characters and generating therefrom another string of characters that is a unique code;
   3) means for printing or marking upon the instrument the usual strings of characters along with the unique code;

B. at the redeeming or clearing or cashing agency:
   1) means for inputting into a computer, the strings of characters marked on the check including the unique code;
   2) program and computer means for selecting certain of those characters and generating therefrom another string of characters that is an authenticating code;
   3) means for comparing the unique code and the authenticating code;
   4) means for signalling that an instrument is bogus when the authenticating and unique codes do not match; and C. means for transmitting from the issuing agency to the clearing agency the program that was used to generate the authenticating code of the particular instrument so that the same program will be used to generate the authenticating code that was used to generate the original unique code.

The potential forger will have no way of knowing which characters from which fields on the check were used in the program and will have no way of knowing how those characters were used to generate a particular unique code. This will be most discouraging to the forger even if the patterns on the check can be reproduced by machine.

These and other objects, features and advantages of the invention will become more apparent when the detailed description is studied in conjunction with the drawings

BRIEF DESCRIPTION OF THE DRAWINGS

FIG. I is a plan view of a check of the invention.

DETAILED DESCRIPTION OF PREFERRED EMBODIMENTS

Figure 1:
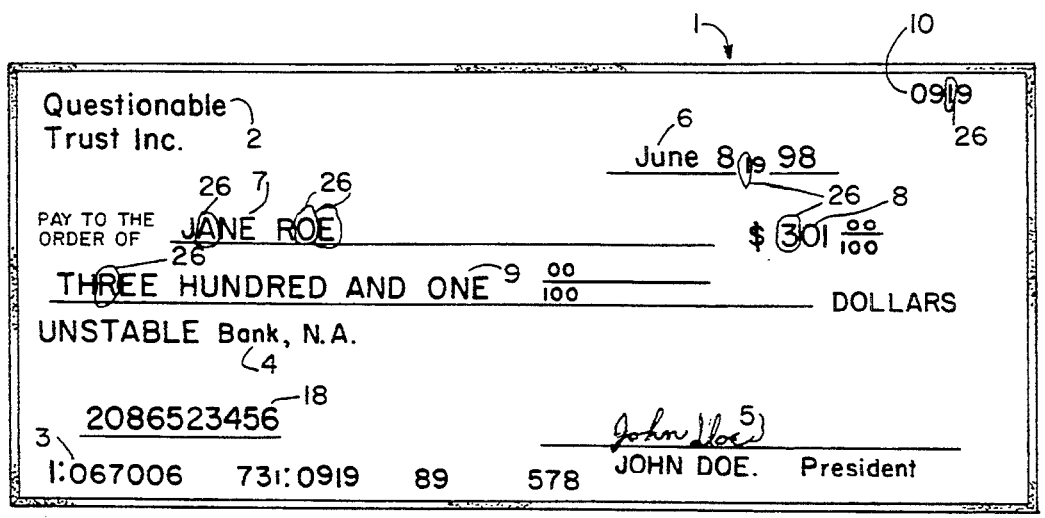

Referring now first to FIG. 1, a representative check 1 is shown. On the check are imprinted fields of strings of characters that do not change from one check to another, including the firm name 2, the account number field 3, bank name field 4, and signature field 5. Any or all of these may be preprinted on the check sheet stock before it is fed to the check printer. In addition, each check must be imprinted with strings of characters in other fields that are variable and may be unique to a particular check, including:

The date field 6 on which the check is issued
The payee field 7 indicating to whom the money is to be paid
The number amount field 8
The alpha amount field 9
The check number field 10

It is the usual practice in industry to have a computer store these variable data and operate a printer which prints out the individual checks with all the appropriate data thereon.

Figure 2:
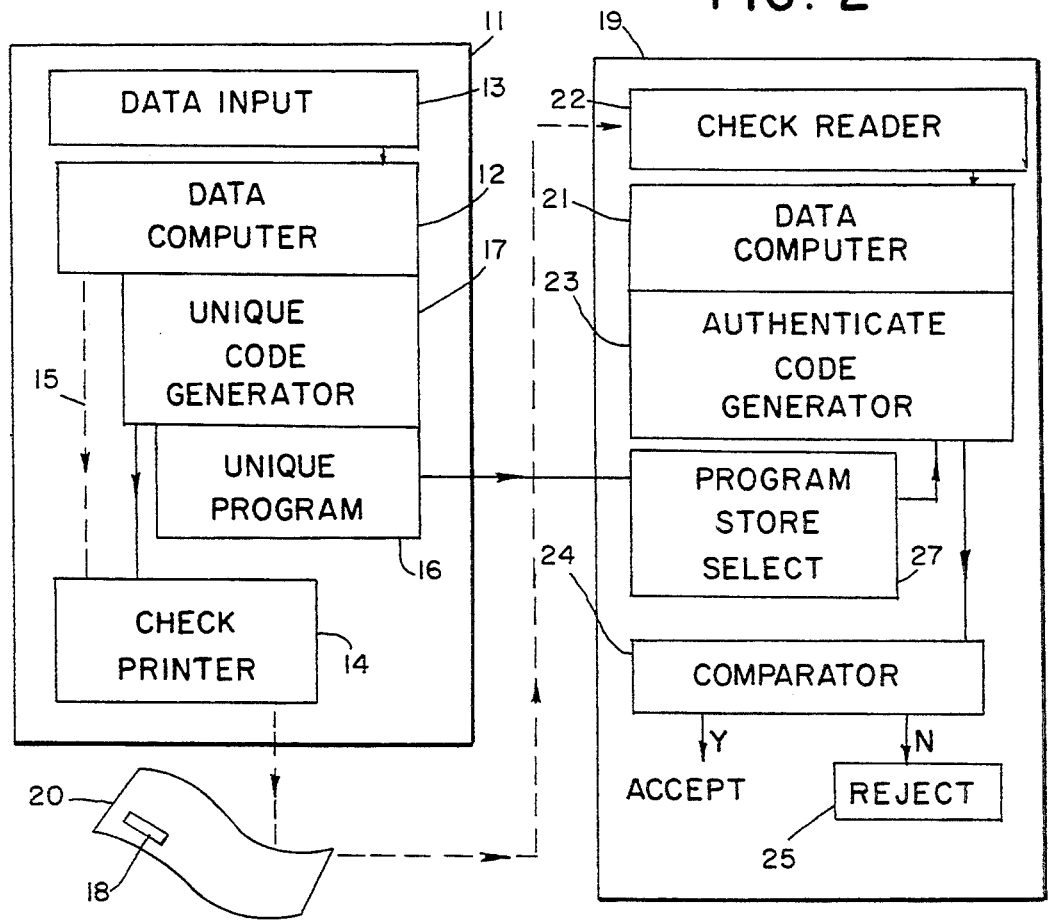
FIG. 2 is a block diagram schematically depicting the system of the invention.

Referring now to FIG. 2, the financial instrument authenticating system of the invention is illustrated schematically by block diagram. At a check issuing station 11, a computer 12 stores data that is input from keyboards 13, other computers and the like, well known in the art for controlling check printer 14. This pathway 15 is conventional. The system of the invention includes a secret program 16 that operates a unique code generator 17 that generates a unique code based on selected characters from the variable fields. This unique code 18 is printed on the check 20 along with all the other data. There are many algorithms well known in cryptography for performing the code generation, some of which include convertion tables for converting letters or numbers to other letters or numbers. Other algorithms require no table.

The system of the invention includes at least one check clearing station 19. When a check 20 is received at the clearing station, certain data thereon are read into the computer 21 by the manual or automatic check reader 22 in a conventional manner, with the exception that the unique code 18 is also read into the computer 21.

Incorporated in the computer is the authenticating code generator 23 that contains the same program 18 that was used by the issuing station when the check was issued. This program generates the authenticating code using the program 16 and the data read off the check by the reader 22. A comparator 24 compares the authenticating code generated by generator 23 with the unique code read off the check. If the two do not match, signal alarm means 25 notifies the operator of a reject or takes other action as desired. If there is a match, the proper credits and debits are performed as in conventional systems.

UNIQUE CODE GENERATOR OPERATION

When generating a unique string of characters, it is desirable to provide an enormous number of possible permutations and combinations to foil any scheme for defeating the system. By arbitrarily selecting any one or more of the characters from any of the variable fields to be printed on the check, an enormous number of variables may be introduced in the generation of the unique code. Referring again to FIG. 1, the program may have selected the characters from the variable fields as indicated by the encircling loops 26.

Each of these characters is converted in a look up or conversion table such as:

TABLE I

| Given character | converted character |
| --- | --- |
| 0 | 23 |
| 1 | 8 |
| 2 | 5 |
| 3 | 6 |
| 4 | 4 |
| 5 | 22 |
| 6 | 11 |
| 7 | 9 |
| 8 | 3 |
| 9 | 32 |
| A | 7 |
| B | 2 |
| C | 6 |
| . | . |
| . | . |

TABLE I-continued

| Given character | converted character |
| --- | --- |
| . | . |
| . | . |
| blank | 48 |

The converted characters may then be introduced in a specific sequence to yield the unique code number. Alternatively, the converted characters may be introduced into a mathematical formula in a particular sequence to generate a result that becomes the unique code number.

Example of a specific program

| Variable Strings of Characters | Character Selected | Symbol in Equation |
| --- | --- | --- |
| ISSUE DATE FIELD | 6th | A |
| PAYEE FIELD | 2nd | B |
| PAYEE FIELD | LAST | C |
| PAYEE FIELD | NEXT TO LAST | D |
| NUMBER AMOUNT FIELD | FIRST | E |
| ALPHA AMOUNT FIELD | THIRD | F |
| CHECK NUMBER FIELD | NEXT TO LAST | G |

After the characters are selected as above, which corresponds to the characters enclosed by loops 26 of FIG. 1, they are converted by the conversion table I.

The converted values are substituted in an equation such as:

$$28 + (A \times B) + (C \times D \times E) - (52F \times G) = \text{UNIQUE CODE}.$$

Any conversion table may be prepared and any of a great many possible mathematical formulas may be employed to generate the unique code 18. The chances of anyone breaking the code are miniscule, and the program may be changed as frequently as desired. The clearing agency must keep a copy of every program and the dates of check issue on which it was used. These programs will be filed in program storage 27 and filed by account number and date, so that when a check is read by reader 22 the computer can select by issue date and account number, the correct program to use to generate the authenticate code using the same program that the issuing agency used. It is to be noted that there is nothing in table I that is unique to any single check. The size of table I does not increase with the number of checks using it. Even if millions of checks employ it, this single small table can be used without significant storage or searching burden on the authenticating station in which all of the check unique data may be read off from the check by a person at the authenticating station. There is no burden on storage anywhere of the unique data imprinted on the check. The stored computer program independently permits generation of the code carried by the check to see if it matches. If it doesn't match, something has been altered. There is no need to store any data unique to the check anywhere in order to authenticate the check.

The system may be used for other financial instruments such as money orders or for other instruments bearing variable strings of characters where one station issues the document and another station must authenticate the document, such as passports.

The characters in the strings and in the unique code may be numbers, letters of any alphabet, idiographs or other symbols, as desired.

In an alternative embodiment of the invention, a common host computer may serve both the issuing station and remote authenticating stations and communications such as telephone lines may be used to connect the host computer to the stations by means well known in the art.

The above disclosed invention has a number of particular features which should preferably be employed in combination although each is useful separately without departure from the scope of the invention. While I have shown and described the preferred embodiments of my invention, it will be understood that the invention may be embodied otherwise than as herein specifically illustrated or described, and that certain changes in the form and arrangement of parts and the specific manner of practicing the invention may be made within the underlying idea or principles of the invention within the scope of the appended claims.

I claim:

1. A counterfeit document detection system for documents bearing variable strings of characters in at least two fields that are recorded at a document printing station and authenticated at one or more remote authenticating stations, the system comprising:
   A) printing means at a printing station for printing on a document variable strings of characters in at least two fields;
   B) a first computer means connected to said printing means for storing information including said variable strings of characters and for communicating said information to said printing means for printing said variable strings of characters on said document;
   C) unique code generating means connected to said first computer means, said unique code generating means for selecting certain of said characters from said strings of characters in at least two fields and generating therefrom another string of characters that is a unique code characterizing the document bearing said variable strings of characters, said unique code generating means including a secret program means for directing said first computer means to select particular characters, and transforming means for transforming the selected characters into another string of other characters to produce said unique code and for printing said unique code on said document along with said variable strings of characters, said secret program means not accompanying said document;
   D) a second computer means at a document authenticating station;
   E) input means connected to said second computer means for entering into said second computer means, at the time of verification of said document and not before, said printed variable string of characters and said unique code read from a document to be authenticated;
   F) authenticating code generating means connected to said second computer means including said secret program means for directing said second computer means to select certain characters from said printed strings of characters as they appear on said document and transforming said certain characters in the same manner as was performed by said first computer means in generating said unique code; and
   G) comparator means for comparing said unique code and said authenticating code for rejecting said document when said unique and authenticating codes do not match and for accepting said document when said codes match, whereby said document bears all the document-specific information necessary for verification of said document when said information is used in combination with said program means.

2. The system according to claim 1, in Which said transforming means includes conversion table means for converting each selected character into another character.

3. The system according to claim 2, in which said transforming means includes at least one mathematical manipulation of the converted characters.

4. The system according to claim 2, in which a plurality of unique program means are provided to said first and second computer means each one of said unique program means for use in connection with the particular issue date born by a document.

5. The system according to claim 1, in which said first and second computer means are a common host computer connected to said printing and authenticating stations.

6. A method for detecting counterfeit documents which bear at least one string of variable characters, the method comprising the steps of:
   A) inputting into a first computer means at least one string of variable characters to be born by a document to be protected against counterfeiting activity;
   B) applying a secret program means to said first computer means for operating on said at least one string of characters, said secret program means not accompanying said document;
   C) selecting, by said first computer means and said program means, certain of said characters from said at least one string of variable characters;
   D) transforming, by transforming steps, the selected characters into another unique string of characters for printing on said document to be protected as a unique code;
   E) printing said unique code on said document to be protected;
   F) authenticating a received document to be authenticated by inputting into a second computer means for authenticating documents, at the time of authentication and not before, the variable characters born by said received document;
   G) selecting, by the use of said secret program means and said second computer means, certain of said characters from said variable characters;
   H) transforming, by transforming steps, using said secret program means, the selected characters from the input variable characters into another unique string of characters to serve as an authenticating code, in which the selection and transforming of the input characters is identical to that performed at the time the unique code was generated and printed on documents to be protected which bear a particular date;
   I) comparing the unique code born by the document to be authenticated with the authenticating code to accept a document as authentic when a match occurs and to reject a document as bogus when a mismatch occurs, whereby said document bears all the document-specific information necessary for verification of said document when said information is used in combination with said program means.

7. The method according to claim 6, in which said transforming steps include conversion of individual characters to converted characters by a conversion table.

8. The method according to claim 7, in which said transforming steps include mathematical manipulation of said converted characters.

9. A counterfeit document detection system for documents bearing variable strings of characters in at least one field that are recorded at a document printing station and authenticated at one or more remote authenticating stations, the system comprising:

A) printing means at a printing station for printing on a document a variable string of characters in at least one field;

B) a first computer means connected to said printing means for storing information including said variable string of characters and for communicating said information to said printing means for printing said variable string of characters on said document;

C) unique code generating means connected to said first computer means, said unique code generating means for selecting certain of said characters from said string of characters and generating therefrom another string of characters that is a unique code characterizing the document bearing said variable string of characters, said unique code generating means including a program means for directing said first computer means to select particular characters, and transforming means for transforming the selected characters into another string of other characters to produce said unique code and for printing said unique code on said document along with said variable string of characters;

D) a second computer means at a document authenticating station;

E) in put means connected to said second computer means for entering into said second computer means, at the time of authentication and not before, the printed variable characters and said unique code read from a document to be authenticated;

F) authenticating code generating means connected to said second computer means before said time of authentication, including said program means for directing said second computer means to select certain characters from the printed string of variable characters as they appear on said document and transforming said certain characters in the same manner as was performed by said first computer means in generating said unique code; and G) comparator means for comparing said unique code and said authenticating code for rejecting said document when said unique and authenticating codes do not match and for accepting said document when said codes match, whereby said document bears all the document-specific information necessary for verification of said document when said information is use in combination with said program means.

10. The system according to claim 9, in which said transforming means includes conversion table means for converting each selected character into another character.

11. The system according to claim 10, in which said transforming means includes at least one mathematical manipulation of the converted characters.

12. The system according to claim 1, in which said certain of said characters is less than all of said characters in said string of characters.

13. The method of claim 6, in which said certain of said characters is less than all of said characters in said string of characters.

14. The system of claim 9, in which said certain of said characters is less than all of said characters in said string of characters.

* * * * *